United States Patent
Van Der Stockt et al.

(10) Patent No.: US 10,565,189 B2
(45) Date of Patent: Feb. 18, 2020

(54) AUGMENTATION OF A RUN-TIME QUERY

(71) Applicant: International Business Machines Corporation, Armonk, NY (US)

(72) Inventors: Stefan A. Van Der Stockt, Austin, TX (US); Sihang B. Fang, Glendale, CA (US); Sarah Lynch, Austin, TX (US); Joseph L. Sharpe, III, Loveland, OH (US); Rahul P. Akolkar, Austin, TX (US); Brian E. Bissell, Fairfield, CT (US); Manali J. Chanchlani, Jersey City, NJ (US)

(73) Assignee: International Business Machines Corporation, Armonk, NY (US)

( * ) Notice: Subject to any disclaimer, the term of this patent is extended or adjusted under 35 U.S.C. 154(b) by 25 days.

(21) Appl. No.: 15/904,656

(22) Filed: Feb. 26, 2018

(65) Prior Publication Data

US 2019/0266270 A1 Aug. 29, 2019

(51) Int. Cl.
*G06F 16/242* (2019.01)
*G06F 17/27* (2006.01)
(Continued)

(52) U.S. Cl.
CPC .......... *G06F 16/243* (2019.01); *G06F 17/271* (2013.01); *G06F 17/2785* (2013.01);
(Continued)

(58) Field of Classification Search
CPC .. G06F 16/243; G06F 17/271; G06F 17/2785; G06F 17/28; G06N 5/003; G06N 20/00; G06K 9/6256
See application file for complete search history.

(56) References Cited

U.S. PATENT DOCUMENTS 7,457,801 B2   11/2008  Liu et al.
9,058,382 B2    6/2015  Liu et al.
(Continued)

FOREIGN PATENT DOCUMENTS

WO         201040143         4/2010

OTHER PUBLICATIONS

Susan Dumais, and Hao Chen, "Hierarchical classification of Web content," Proceedings of the 23rd annual international ACM SIGIR conference on Research and development in information retrieval. ACM, 2000.
(Continued)

*Primary Examiner* — Walter Yehl
(74) *Attorney, Agent, or Firm* — Lieberman & Brandsdorfer, LLC

(57) ABSTRACT

A system, computer program product, and method are provided to leverage a taxonomy service to format ground truth data. An artificial intelligence platform processes ground truth data, including identification of one or more applicable taxonomy tags. The identified tags are filtered and applied to the ground truth data, thereby constructing an output string that incorporates the ground truth data together with one or more of the identified tags, effectively transforming the ground truth data. Application of the transformed ground truth data is employed to accurately identify the source and/or meaning of the natural language, and in one embodiment, to product a physical action or transformation of a physical hardware device.

20 Claims, 9 Drawing Sheets

(51) Int. Cl.
*G06K 9/62* (2006.01)
*G06N 20/00* (2019.01)
*G06N 5/00* (2006.01)
*G06F 17/28* (2006.01)

(52) U.S. Cl.
CPC .......... *G06F 17/28* (2013.01); *G06K 9/6256* (2013.01); *G06N 5/003* (2013.01); *G06N 20/00* (2019.01)

(56) References Cited

U.S. PATENT DOCUMENTS

| | | | |
|---|---|---|---|
| 9,390,378 | B2 | 7/2016 | Garera et al. |
| 9,477,652 | B2 | 10/2016 | Huang |
| 10,169,471 | B2 * | 1/2019 | Dayan ................. G06F 16/9535 |
| 2004/0024739 | A1 * | 2/2004 | Copperman .......... G06F 16/367 |
| 2008/0228749 | A1 * | 9/2008 | Brown ................. G06F 16/7844 |
| 2010/0293180 | A1 * | 11/2010 | Vanderwende ....... G06F 16/338 |
| | | | 707/759 |
| 2015/0220511 | A1 * | 8/2015 | Yang ................... G06F 16/3344 |
| | | | 704/9 |
| 2016/0085853 | A1 * | 3/2016 | Zelevinsky ......... G06F 16/3338 |
| | | | 707/765 |
| 2016/0180242 | A1 | 6/2016 | Byron et al. |
| 2016/0203130 | A1 * | 7/2016 | Roque ................. G06F 17/2705 |
| | | | 707/741 |
| 2019/0266281 | A1 * | 8/2019 | Van Der Stockt .... G06F 16/258 |

OTHER PUBLICATIONS

Rafael A. Calvo, Jae-Moon Lee and Xiaobo Li, "Managing content with automatic document classification," Journal of Digital Information, vol. 5, No. 282, 2004.

R. Snow, S. Prakash, D. Jurafsky, and A. Y. Ng, "Learning to Merge Word Senses," In Proc. of the 2007 Joint Conference on Empirical Methods in Natural Language Processing and Computational Natural Language Learning (EMNLP-CoNLL), Prague, Czech Republic, pp. 1005-1014.

* cited by examiner

AUGMENTATION OF A RUN-TIME QUERY

BACKGROUND

The present embodiment(s) relate to natural language processing. More specifically, the embodiment(s) relate to an artificial intelligence platform to augment data with an associated taxonomy classification.

In the field of artificial intelligent computer systems, natural language systems (such as the IBM Watson™ artificial intelligent computer system and other natural language question answering systems) process natural language based on knowledge acquired by the system. To process natural language, the system may be trained with data derived from a database or corpus of knowledge, but the resulting outcome can be incorrect or inaccurate for a variety of reasons relating to the peculiarities of language constructs and human reasoning.

Machine learning, which is a subset of Artificial intelligence (AI), utilizes algorithms to learn from data and create foresights based on this data. AI refers to the intelligence when machines, based on information, are able to make decisions, which maximizes the chance of success in a given topic. More specifically, AI is able to learn from a data set to solve problems and provide relevant recommendations. AI is a subset of cognitive computing, which refers to systems that learn at scale, reason with purpose, and naturally interact with humans. Cognitive computing is a mixture of computer science and cognitive science. Cognitive computing utilizes self-teaching algorithms that use data minimum, visual recognition, and natural language processing to solve problems and optimize human processes.

Cognitive systems are inherently non-deterministic. Specifically, data output from cognitive systems are susceptible to information provided and used as input. For example, as new machine learning models are deployed there is no guarantee that the system will extract the same entities as done previously. New models may adversely affect prior model results. Similarly, an error introduced through a document may result in extracting incorrect data and providing the incorrect data as output. Accordingly, there is a need to create deterministic behavior in the cognitive system(s).

SUMMARY

The embodiments include a system, computer program product, and method for natural language processing directed at deterministic data for cognitive systems.

In one aspect, a computer system is provided with a processing unit operatively coupled to memory, and an artificial intelligence platform, in communication with the processing unit. A knowledge engine is provided in communication with the processing unit and functions to transform ground truth (GT) data by the artificial intelligence platform. More specifically, the knowledge engine constructs a training module to identify one or more taxonomy tags related to an ontology path of the GT data, and executes the constructed training module. The execution applies the identified taxonomy tags to the GT, which includes appending the identified tags to the GT. In addition, the knowledge engine constructs a query in the form of a string of the GT with one or more of the identified taxonomy tags prepended to the string. The query includes at least one synset and an immediate hypernym to an ontology path of the GT data.

In another aspect, a computer program device is provided to process natural language (NL). The computer program product comprising a computer readable storage device having program code embodied therewith. The program code is executable by a processing unit to transform ground truth (GT) data by the artificial intelligence platform. The transformation includes program code to construct a training module to identify one or more taxonomy tags related to an ontology path of the GT data, and execute the constructed training module to apply the identified taxonomy tags to the GT, including appending the identified tags to the GT. Program code is further provided to construct a query in the form of creating a string of the GT with one or more of the identified taxonomy tags prepended to the string. The query includes at least one synset and an immediate hypernym to an ontology path of the GT data.

In yet another aspect, a method is provided for processing natural language, including transforming ground truth (GT) data by an artificial intelligence platform. A training module is constructed to identify one or more taxonomy tags related to an ontology path of the GT data. The training module is executed, with the execution including application, of the identified taxonomy tags to the GT, which further includes appending the identified tags to the GT. A query is constructed leveraging the training module. The query includes a string of the GT with one or more of the identified taxonomy tags prepended to the string. More specifically, the query includes at least one synset and an immediate hypernym to an ontology path of the GT data.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings reference herein forms a part of the specification. Features shown in the drawings are meant as illustrative of only some embodiments, and not of all embodiments, unless otherwise explicitly indicated.

DETAILED DESCRIPTION

It will be readily understood that the components of the present embodiments, as generally described and illustrated in the Figures herein, may be arranged and designed in a wide variety of different configurations. Thus, the following details description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiments. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Taxonomy is the science of classification according to a pre-determined system, with a resulting catalog used to provide a conceptual framework for analysis of information retrieval. In one embodiment, the taxonomy may be referred to as a collection of controlled vocabulary terms organized into a hierarchical structure. A controlled vocabulary is a list of standardized terminology for use in indexing and retrieval of information. The development of a taxonomic classification separates elements of a group into sub-groups. More specifically, taxonomic classification enables categorization according to a topic and associated information retrieval. The taxonomic classification, and specifically the topic, provides an understanding and intent for the classified information. With respect to machine learning and natural language processing, taxonomic classification functions as a model to understanding unstructured data. Once a classification is derived and attached to unstructured data, the data is essentially converted into structured data, also referred to herein as knowledge.

Figure 1:
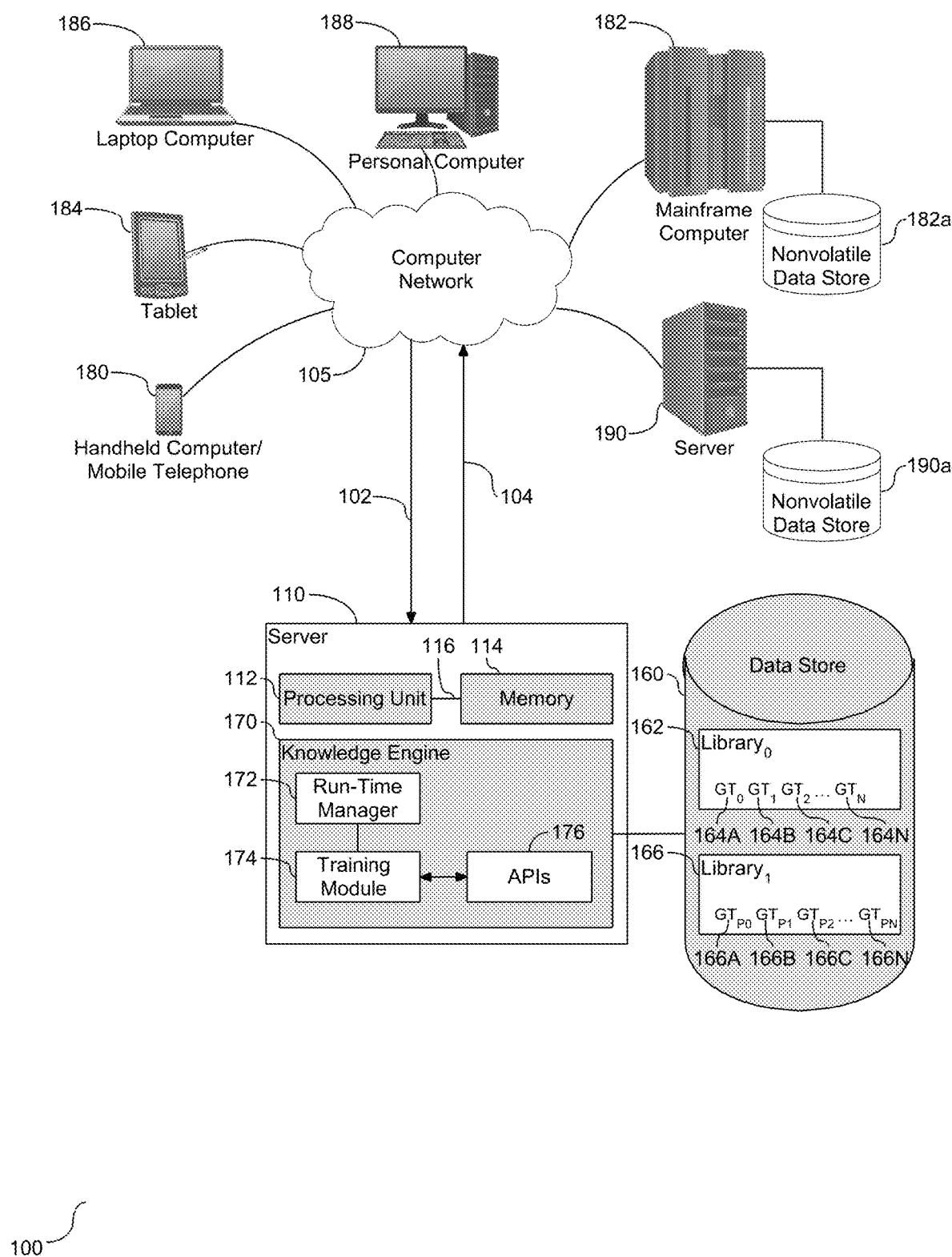
FIG. 1 depicts a system diagram illustrating a schematic diagram of a natural language process system.

Ground truth (GT) is a term used in machine learning that refers to information provided by direct observation, e.g. empirical evidence, as opposed to information provided by inference. Attaching one or more taxonomy tags to GT data provides structure and meaning to the data. Referring to FIG. 1, a schematic diagram of a natural language processing system (100) is depicted. As shown, a server (110) is provided in communication with a plurality of computing devices (180), (182), (184), (186), and (188) across a network connection (105). The server (110) is configured with a processing unit (112) operatively coupled to memory (114) across a bus (116). A tool in the form of a knowledge engine (170) is shown local to the server (110), and operatively coupled to the processing unit (112) and/or memory (114). As shown, the knowledge engine (170) contains one or more tools (172)-(174) and one or more application program interfaces (APIs) (178). The tools (172)-(174) and API(s) (176) provide natural language (NL) processing over the network (105) from one or more computing devices (180), (182), (184), (186), and (188). More specifically, the computing devices (180), (182), (184), (186), and (188) communicate with each other and with other devices or components via one or more wires and wireless data communication links, where each communication link may comprise one or more wires, routers, switches, transmitters, receivers, or the like. In this network arrangement, the server (110) and the network connection (105) may enable natural language processing and augmentation of GT data for one or more users of content. Other embodiments of the server (110) may be used with components, system, sub-systems, and/or devices other than those depicted herein.

The tools, including the knowledge engine (170), or in one embodiment, the tools embedded therein, including the training module (174), or the tools operatively coupled to the knowledge engine (170) including a run-time manager (172), may be configured to receive input from various sources, including but not limited to input from the network (105) and/or a data store (160). The one or more NL APIs (176) function as a taxonomy service to process GT data, also referred to herein as raw text data.

The various computing devices (180), (182), (184), (186), and (188) in communication with the network (105) demonstrate access points for content creators and content uses. Some of the computing devices may include a corpus of data as a body of information used by the knowledge engine (170), and in one embodiment the tools (172)-(174), to embed structure to the GT data. The network (105) may include local network connections and remote connection in various embodiments, such that the knowledge engine (170) and tools (172)-(174) may operate in environments of any size, including local and global, e.g. the Internet.

The data store is provided with a library or storage unit (162) of independent lines of GT data. As shown in this example, library, $library_0$, (162) has multiple lines of GT data referred to herein as $GT_0$ (164$_A$), $GT_1$ (164$_B$), $GT_2$ (164$_C$) ... $GT_N$ (164$_N$). The quantity of lines of GT data in the library (162) should not be considered limiting. The knowledge engine (170) communicates with a taxonomy service to support an initial processing of each of the lines. In one embodiment, the taxonomy service is local to the server (110) and represented at (190). Similarly, in one embodiment, the taxonomy service is provided across the network (105) and is supported by one of the various computing devices (180), (182), (184), (186), and (188). The initial process selectively identifies taxonomy tags for the lines of GT data. The knowledge engine (170) augments the processed lines of GT. More specifically, the knowledge engine (170) re-formats each of the processed lines of GT with the identified tags. In one embodiment, each identified tags is a string that is pre-pended to the processed line. As show, a second library, $library_1$ (166), is shown local to the data store (160). The processed lines are shown in the second library (166) with the tags attached to the original GT line data referred to herein as $GT_{P0}$ (166$_A$), $GT_{P1}$ (166$_B$), $GT_{P2}$ (166$_C$) ... $GT_{PN}$ (166$_N$). Accordingly, the knowledge engine (160) processes the lines of GT data through a taxonomy service, and preliminarily transforms GT data with identified tags.

To assess an initial value added from the taxonomy processing and preliminary GT data transformation, the knowledge engine (170) conducts an analysis to quantify or identify any value added. More specifically, the knowledge engine (170) analyzes the original lines of GT data in $library_0$ (162), and also analyzes the preliminarily transformed GT data in $library_1$ (166). In one embodiment, the analysis of the data in the libraries (162) and (166) is conducted separately. By conducting the separate analysis, the knowledge engine (160) quantifies performance added to the augmented data. For example, the analysis may categorize the analyzed tags, e.g. high performance, neutral, low performance, etc., and selectively remove a tag in the low performance category. The results of the analysis conducted by the knowledge engine (170) are an assessment of value added to the GT with one or more taxonomy tags attached.

The training module (174) is utilized to filter the taxonomy tags attached to the GT. Whether a line of GT contains one tag or multiple tags, the training module (174) leverages the value assessment conducted by the knowledge engine (170) to selectively filter the applied and evaluated tags. The run-time manager (172) is provided operatively coupled to the training module (174) and the knowledge engine (170). The run-time manager (172) functions to format the query after the analysis has concluded. More specifically, the run-time manager (172) constructs the query comprised of one or more of the taxonomy tags that have been filtered by the training module (174), and formats the query with the constructed output string. In one embodiment, the training module (174) processes two or more tags and retains at least one applicable tag to be pre-pending to the GT data. In one embodiment, at least two tags remain following the filtering with one of the tags being a synset and one of the tags being an immediate hypernym to an ontology path of the GT data.

The tags remaining after the filtering process has concluded are pre-pended to the GT data and form a constructed query, and in one embodiment, the GT data with the pre-pending output string is stored in the data store. In one embodiment, the modified GT data via the training module (174) replaces the equivalent data in library$_1$ (166). Accordingly, any low performance tags should have been omitted or removed through a preliminary augmentation of the output string prior to pre-pending to a final GT data augmentation stored in the data store (160).

As shown and described, a training module (174) is utilized by the knowledge engine to analyze and filter the tag to create an optimal pre-pending line of GT data. In one embodiment, the knowledge engine (170) constructs the string with the GT and the prepended taxonomy tag(s) as represented in the second library, library$_1$, (166). A further assessment of the modified GT data is directed at assessment of confidence. More specifically, the training module (172) is employed by the knowledge engine (170) to apply the identified tags for the GT data to a confidence assessment. The training module (174) may utilize a static parameter for the assessment, or in one embodiment, the training module (174) may utilize a configurable parameter for the assessment.

The library, library$_0$, (162) is shown with multiple taxonomy tags, including $GT_0$ ($164_A$), $GT_1$ ($164_B$), $GT_2$ ($164_C$) ... $GT_N$ ($164_N$). Although a limited quantity of taxonomy tags are shown, this quantity should not be considered limiting. The library (162) is operatively coupled to the training module (174), thereby enabling and facilitating utilization of the taxonomy tags with respect to GT data processing. It is understood that the population of taxonomy tags in the library (162) should be directed at optimizing GT data. In one embodiment, there may be an over-population of the library, which would necessitate or benefit from removal of one or more taxonomy tags. Similarly, in one embodiment, the library (162) may benefit from retaining those tags that enhance the GT data, which may include removing one or more select tags from the library. The knowledge engine (170) functions as a manager to control the population of taxonomy tags stored in the library (162), which in one embodiment, includes removing one or more tags that have been determined to negative impact performance of the GT data optimization and processing. Accordingly, the knowledge engine (170) functions as oversight to the library (162) to control population of the taxonomy tags.

Figure 2:
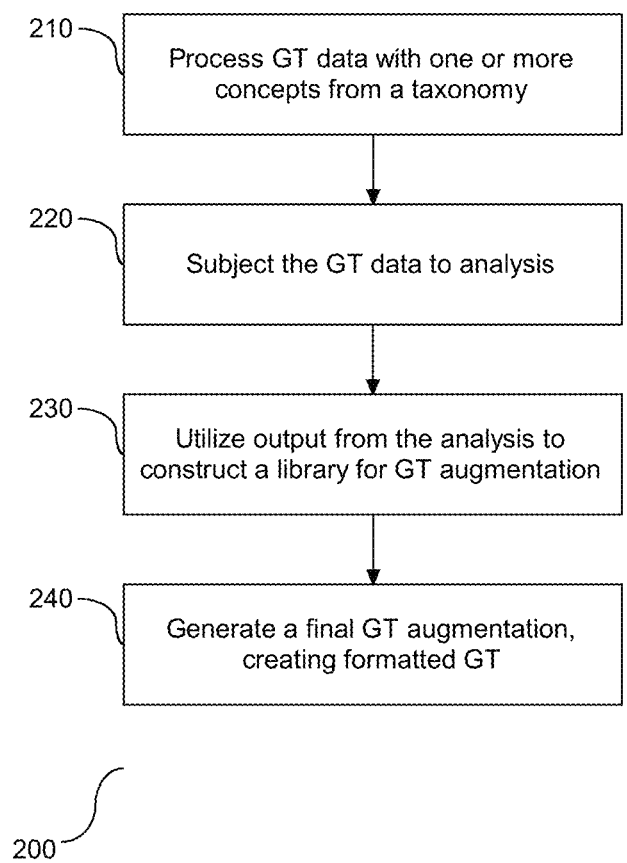
FIG. 2 depicts a flow chart illustrating an overview of ground truth (GT) data augmentation.

As shown and described below ground truth data is processed and effectively transformed into knowledge through augmentation. Referring to FIG. 2, a flow chart (200) is provided to illustrate the overview of ground truth (GT) data augmentation. As shown, the initial aspect is directed at processing GT data with one or more general concepts from a taxonomy, or a taxonomy service, (210). Details of the GT augmentation process are shown and described in FIG. 3. Following the initial GT processing, the GT data is subject to an analysis (220), including comparison of the data in its original form with the processed GT data. Details of the analysis are shown and described in FIG. 5. Output from the analysis yields an indication of the benefits associated with the preliminary GT data augmentation. This output is utilized for training, and specifically for constructing a library of beneficial GT data augmentation (230). Details of the library construction are shown and described in FIG. 6. Steps (210)-(230) may be referred to herein as preliminary aspects of the GT data augmentation. Following the library construction at step (230), the library is utilized to generate a final GT augmentation of the data, including constructing a string to prepend to the GT data, effectively creating a formatted GT (240). In one embodiment, the final augmentation takes place in real-time. Details of the final GT augmentation are shown and described in FIG. 7. Accordingly, a library is created and utilized to appropriately filter and format data in order to provide context to unstructured data.

Figure 3:
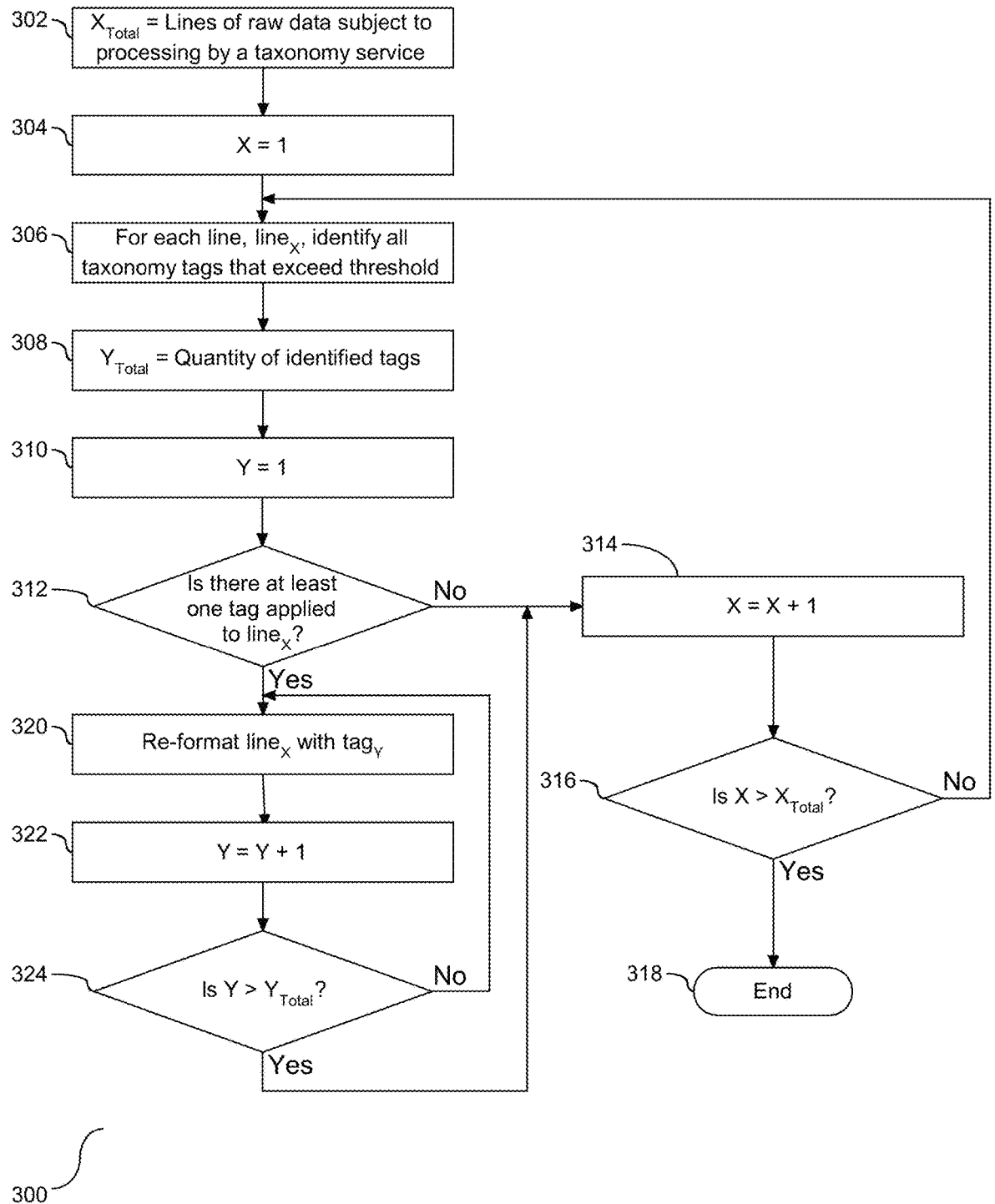
FIG. 3 depicts a flow chart illustrating a process for augmenting GT data.

Referring to FIG. 3, a flow chart (300) is provided illustrating a process for augmenting GT data. Ground truth data, also referred to herein as raw data, is submitted to a taxonomy service for processing, and specifically to detect all possible taxonomy tags that are present and may be applicable to the GT data. The variable $X_{Total}$ is assigned to the quantity of lines of raw data subject to processing by a taxonomy service (302). Although, in one embodiment, the raw data is merely streamed to the taxonomy service. An associated line counting variable, X, is initialized (304). For each line of raw data, line$_X$, all taxonomy tags that meet or exceed a threshold that are present in line$_X$ are identified (306). The quantity of identified tags is assigned to the variable $Y_{Total}$ (308). The threshold is employed as a filter to limit application of tags. In one embodiment, the threshold is a configurable value and reflects a confidence value in the tag and its attachment to the raw data. The confidence value functions as a configurable filter to remove or otherwise exclude obviously bad results that have a low confidence. More specifically, the confidence value limits presence of noise in the results, and in one embodiment is important for training. As demonstrated below in FIG. 8, the confidence value is also employed during run time. In one embodiment, the confidence value employed during training is stricter in comparison to the confidence value employed during run-time. A tag counting variable, Y, is initialized (310), which is implemented on a line basis or on the totality of raw data subject to processing. After the line of data has been initially processed, it is determined if there is at least one tag applied to the line, line$_X$, of data (312). A negative response to the determination at step (312) is followed by incrementing the line counting variable (314) and further determining if all of the lines of data have been subject to the initial processing (316). A negative response to the determination at step (316) is followed by a return to step (306), and a positive response is followed by conclusion of the initial GT augmentation process (318).

At shown at step (312), if at least one tag is identified in view of the threshold, then the raw data, or more specifically, line$_X$ of the raw data, is subject to reformatting. For example, line$_X$ is re-formatted with tag$_Y$ (320). In one embodiment, the identified tag, tag$_Y$, is prepended to line$_X$ of the raw data, thereby creating an augmented line of GT. Following step (320), the tag counting variable is incremented for line$_X$ (322), and it is determined if all of the identified tags subject to the threshold have been evaluated (324). A negative response to the determination at step (324) is followed by a return to step (320) for continued processing of the tags in line$_X$, and a positive response is followed by a return to step (314) to evaluate processing any other lines of raw data. In one embodiment, there may be two or more tags attached to a single line of raw data, and an ordering is applied to the prepending. For example, in one embodiment, the tags are prepended in alphabetical order, although this order is not limiting, and other sorting and ordering algorithms may be applied. It is understood that the order of the prepended tags may be critical to a natural language processing system, and as such, the ordering of multiple tags for a single line of GT in training data should be applied in the same way as the tags would be ordered for a query at run-time. Accordingly, the initial GT augmentation process is directed at an initial confidence threshold and application of identified tags to the raw data to create tagged GT data for training.

Figure 4:
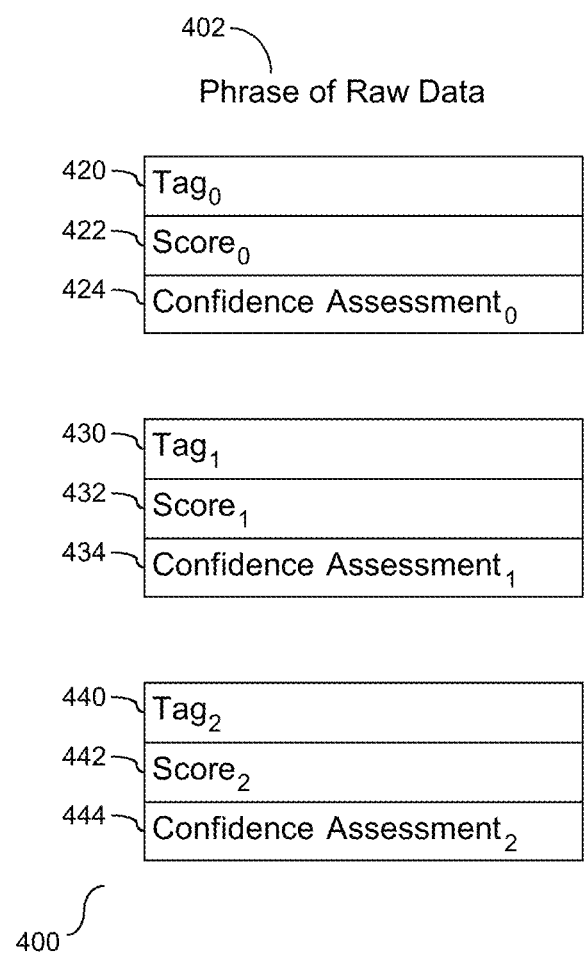
FIG. 4 depicts a block diagram illustrating an example of raw data subject to an initial process and threshold assessment for creating training data.

Referring to FIG. 4, a block diagram (400) is provided illustrating an example of raw data subject to an initial process and threshold assessment for creating training data. The phrase (402) demonstrates sample raw data, which in one embodiment as also referred to as a line of raw data. Three sets of taxonomy tags are identified by a taxonomy service and are subject to a confidence threshold assessment. As shown herein each set of tags has a separate confidence score and assessment. Specifically, tag$_0$ (420) is shown with confidence score$_0$ (422) and confidence assessment$_0$ (424); tag$_1$ (430) is shown with confidence score$_2$ (432) and confidence assessment$_2$ (434); and tag$_2$ (440) is shown with confidence score$_2$ (442) and confidence assessment$_2$ (444). The tags that will remain attached for the training data are the tags that have an assessed value that meets or exceeds the threshold value. For example, in the example shown herein if the confidence assessment value is 10 percent, then tag$_0$ (420) and tag$_1$ (430) remain and tag$_2$ (440) is removed from consideration. The remaining tags, tag$_0$ (420) and tag$_1$ (430), are prepended to the phrase (402). If in one embodiment, the confidence assessment value is 25 percent, e.g. below a set threshold, then only tag$_0$ (420) will remain and be prepended to the phrase (402). Accordingly, the threshold value functions as a filter in application of one or more tags to augment the training data.

Figure 5:
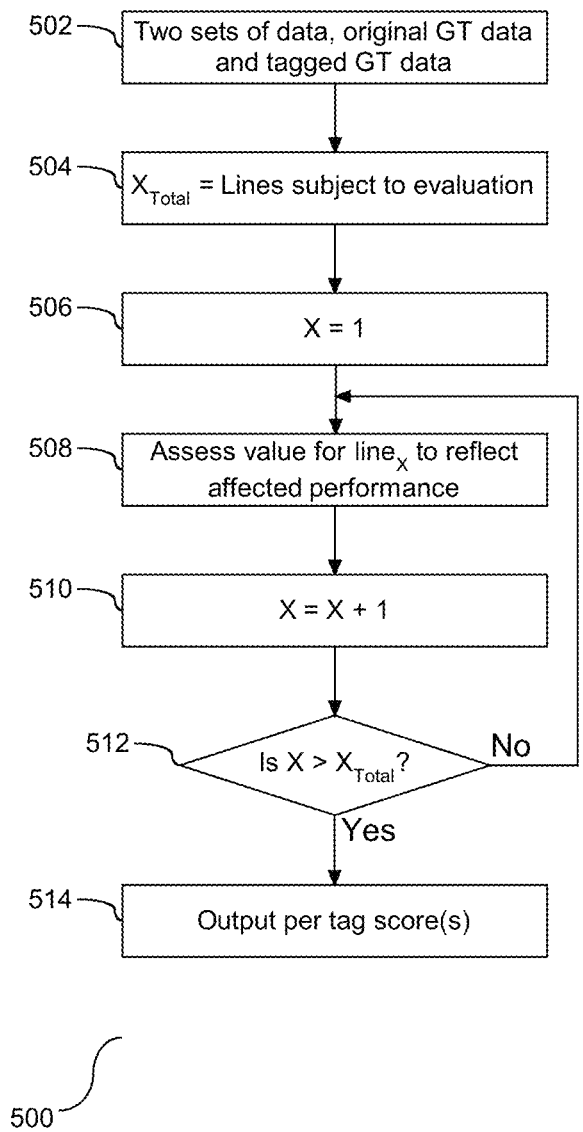
FIG. 5 depicts a flow chart illustrating a process for assessing any processing improvements from the augmented training data.

It is understood that the creation of the augmented GT data from FIG. 3 may create a processing burden. Specifically, processing irrelevant tags utilizes resources that likely will produce false returns. One solution to detect irrelevant tags that were applied during the GT training process is to compare query results from processing raw data and processing comparable training data. Referring to FIG. 5, a flow chart (500) is provided illustrating a process for assessing any processing improvements from the augmented training data. At the outset there are two sets of data, including a first set identified as the original GT data and a second set identified as tagged GT (502). Validation testing is separately conducted on each of the data sets. Namely, the validation testing is conducted on the original GT data, also referred to as the first set, and separate validation is conducted on the tagged GT data, also referred to as the second set. The goal is to assess if performance has been raised through the text augmentation. The validation for both sets is conducted on a line-by-line basis. As such, a line counting variable, X$_{Total}$, is assigned to the number of lines of data subject to evaluation (504), and an associated line counting variable is initialized (506). For each line, line$_X$, a value is assessed to reflect how the tag(s) affected performance (508). In one embodiment, there are three elements being assessed, including improvement, neutral, and deteriorate. Each line subject to evaluation can have zero of more tags present. The performance evaluation is not tag specific if there are more than one tag present in the line. The functionality here is to record and quantify the effect of tagged GT. Performance assessment is based on precision and recall. The following pseudo code demonstrates the line evaluation:

```
all_tags = list of unique tags across all the data
for tag in all tags:
        improve = 0
        neutral = 0
        deteriorate = 0
ra = results_tags [row] ["recall"]
rb = results_orig [row] ["recall"]
pa = results_tags [row] ["precision"]
pb = results_orig [row] ["precision"]
//mark the row with improve score//
        If (ra>rb) and (pa>pb):
                Improve += 1
        If (ra = = rb) and (pa>pb):
                Improve += 1
        If (ra < rb) and (pa>pb):
                Neutral += 1
        If (ra>rb) and (pa<pb):
                Improve += 1
        If (ra = = rb) and (pa<pb):
                Deteriorate += 1
        If (ra < rb) and (pa<pb):
                Deteriorate += 1
        If (ra>rb) and (pa==pb):
                Improve += 1
        If (ra = = rb) and (pa==pb):
                Neutral += 1
        If (ra < rb) and (pa==pb):
                Deteriorate += 1
```

The pseudo code is applied for each line, e.g. row. As such, following step (508), the line counting variable, X, is incremented (510), followed by assessing if each of the lines have been evaluated (512). After each of the rows have been processed and cross validated, output is created for the tags in the augment GT (514). The following pseudo code demonstrates the per-tag score output:

```
all_tags [tag] [improve] = improve
all_tags [tag] [neutral] = neutral
all_tags [tag] [deteriorate] = deteriorate
```

The per-tag scores reflects the total usages of the tag in the assessed lines indicating the number of occurrences that reflect a performance improvement, did nothing, or negatively impacted performance by being included in the augmented GT. Accordingly, the assessment shown herein effectively analyzes and quantifies the GT augmented data.

After the quantification in FIG. 5 is completed, a 'whitelist' of only those tags that bolster overall performance is created. In one embodiment, the whitelist is a document that mentions a subset of tags that are deemed useful. It is understood that some tags may not have value, or their value is minimal. Removing under-performing tags from the whitelist improves performance associated with deployment. Similarly, removing tags that are determined to occur infrequently may also be removed from the whitelist. Logic is employed to determine which tags should be included in the whitelist. In one embodiment, the logic is deployed in an automated manner. Similarly, in one embodiment, one or more parameters employed by the logic to decide which tags to keep are configurable.

Figure 6:
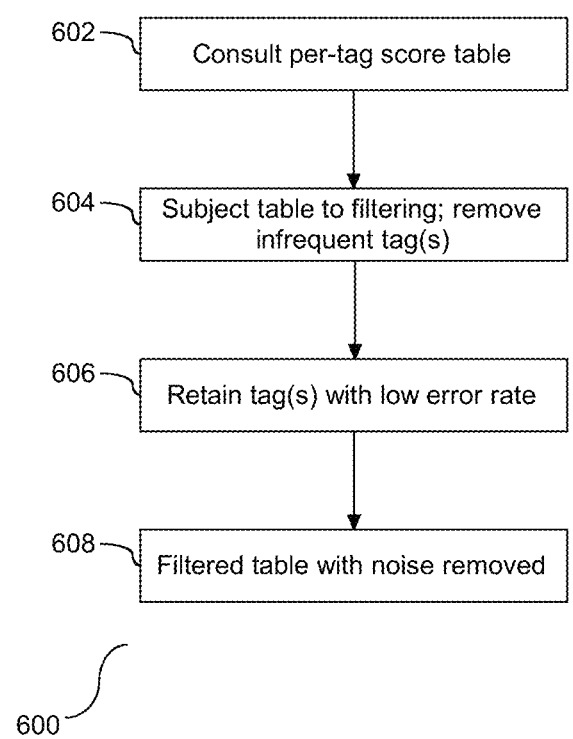
FIG. 6 depicts a flow chart illustrating a process for creating the whitelist of tags.

Referring to FIG. 6, a flow chart (600) is provided illustrating a process for creating the whitelist of tags. As shown, a per-tag score table is consulted (602). In one embodiment, the table is based on the tag quantification shown and described in FIG. 5. The table is subject to filtering to remove tags that occur infrequently (604). In one embodiment, the filter may remove tags that occur less than 0.1% of the time, although this value is configurable. Similarly, in one embodiment, these tags may be referred to as noise. Of the remaining tags, only tags with a low error rate are retained (606). In one embodiment, a value is applied to the error rate at step (606) for filtering and removing further tags from the table. For example, the error rate may be applied to tags with a default of 5%, although this error rate value is configurable. In one embodiment, the error rate may be set zero if stringent control is required. In another embodiment, offensive or sensitive tags may be selectively removed from the table. Following step (606) the table has been selectively filtered to remove noise and low value tags (608), effectively creating a whitelist. Accordingly, the filtered table, also referred to herein as the whitelist, is populated with tags that have been assessed as useful for application to GT data.

Figure 7:
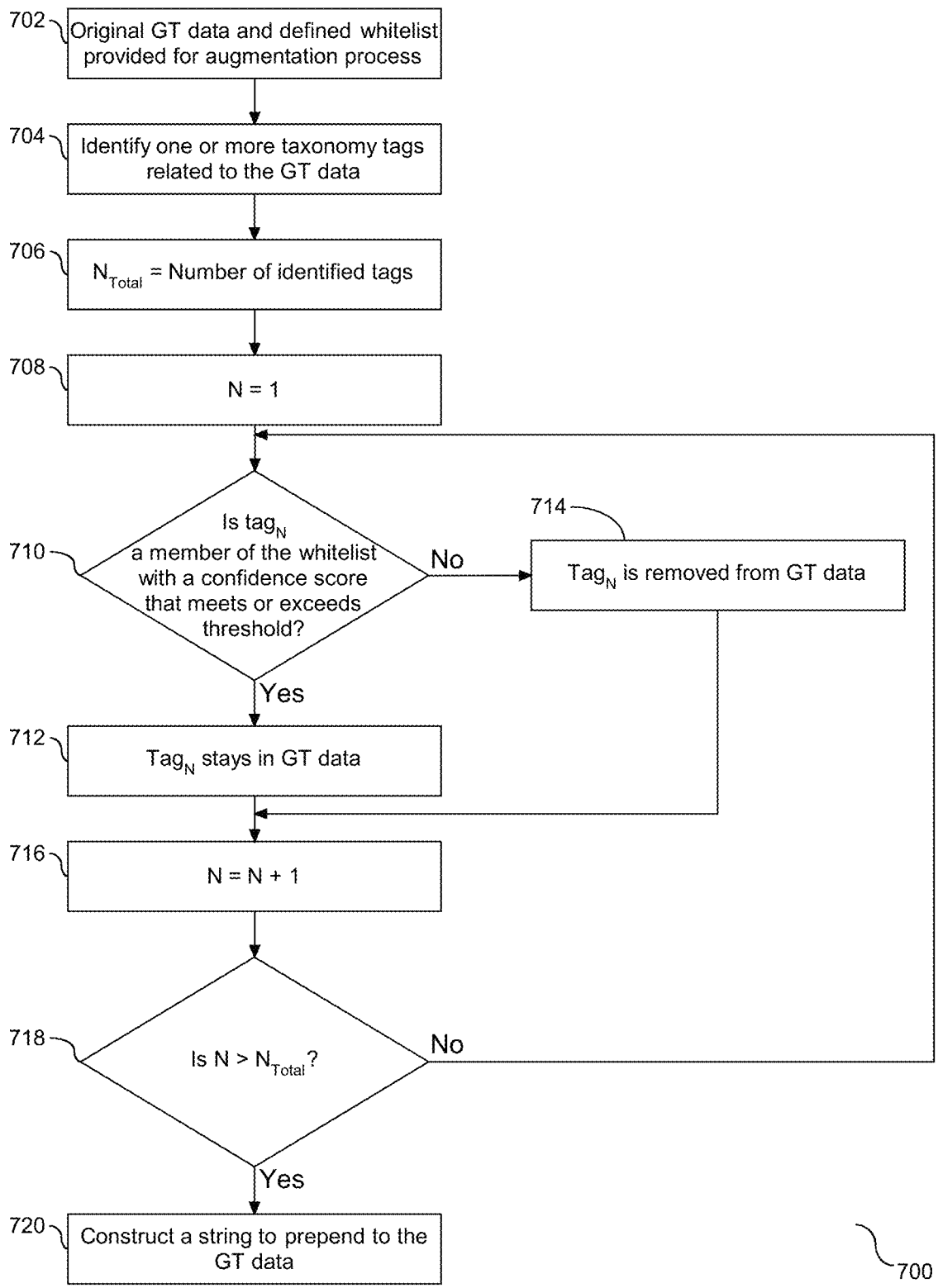
FIG. 7 depicts a flow chart illustrating a process for creating final ground truth that may be applied to train an artificial intelligence platform.

Referring to FIG. 7, a flow chart (700) is provided illustrating a process for creating final ground truth that may be applied to train an artificial intelligence platform. This entails tagging the original GT data with only those tags that are present in the whitelist and exceed a defined confidence threshold. In one embodiment, the GT data tagging is similar to the process shown and described in FIG. 3 with logic employed to ensure each tag is present in the whitelist before proceeding with tagging each line. As shown, the original GT data and a defined whitelist are provided for the augmentation process (702). Using a taxonomy, one or more appropriate taxonomy tags as related to the GT data are identified (704). The variable $N_{Total}$ is assigned to the quantity of identified tags (706), and an associated tag counting variable, N, is initialized (708). For each tag, N, it is determined if the tag is a member of the whitelist and has a confidence score that meets or exceeds a threshold value (710). In one embodiment, the confidence score is set at 0.75. Similarly, in one embodiment, the confidence score is a configurable value. A positive response to the determination at step (710) is followed by retaining the tag, e.g. $tag_N$, in the GT data (712), and a negative response is followed by removing the tag from the GT data (714). Following either step (712) or (714), the tag counting variable, N, is incremented (716), and it is determined if all of the identified tags have been evaluated (718). A negative response to the determination at step (718) is following by a return to step (710). However, a positive response to the determination at step (712) is followed by constructing a string to prepend to the GT data (720), effectively constructing final training data for the artificial intelligence platform. In one embodiment, each line of GT data is reformatted with one or more identified tags that survive the evaluation at step (712), with the reformatting to prepend the tag(s) to the GT data line. Accordingly, the whitelist is deployed to apply a filtered set of tags to the GT data.

Figure 8:
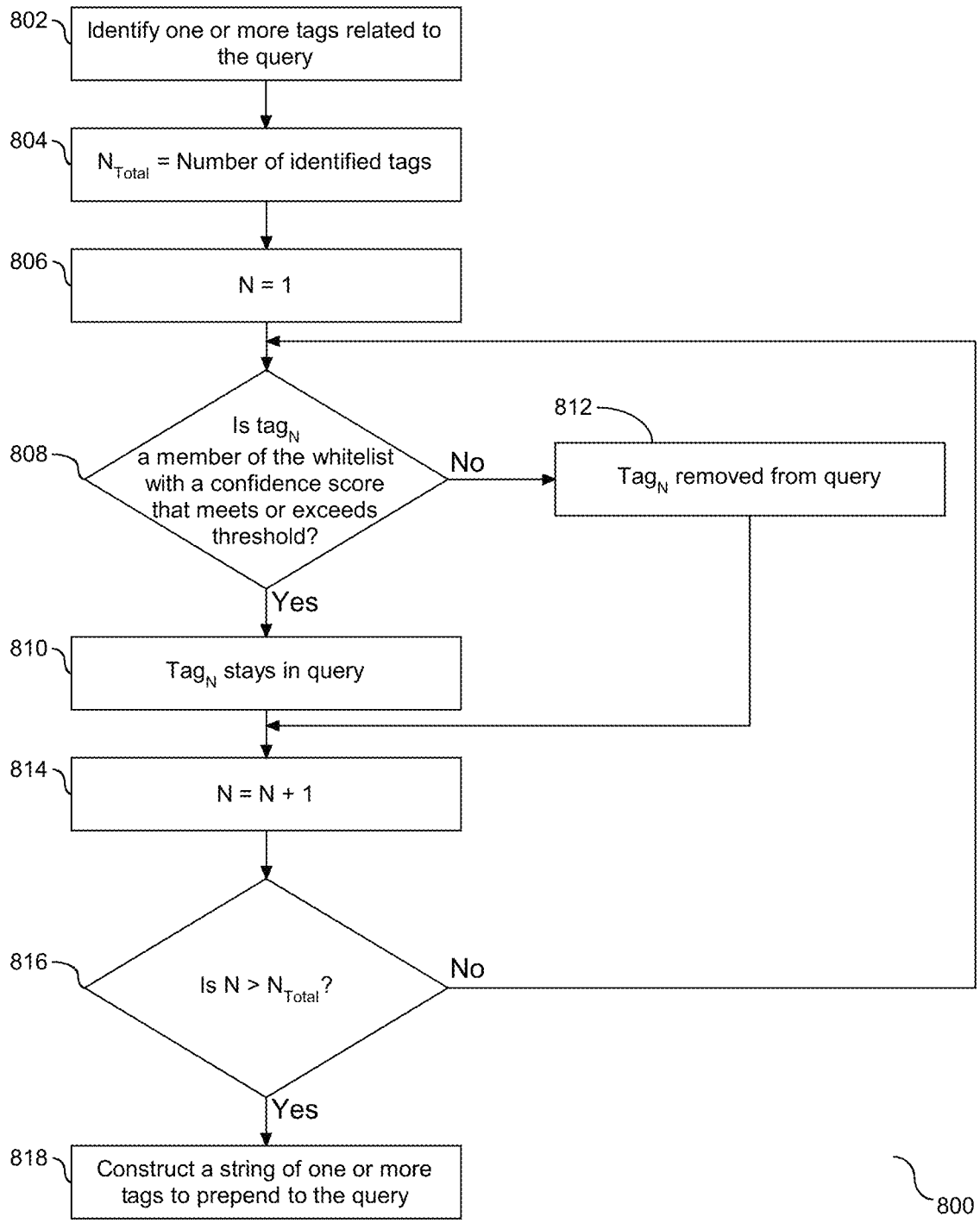
FIG. 8 depicts a flow chart illustrating a process for augmenting a run-time query.

As shown and described in FIGS. 2-7, one or more tags have been identified, filtered from the whitelist based on taxonomy confidence, and filtered from application to the GT data based on their absence from the whitelist. In one embodiment, the processes shown and described in FIGS. 2-7 are referred to as a training process in which tags were found using a taxonomy, one or more select tags were filtered out based on taxonomy confidence, or in one embodiment, low confidence, one or more select tags were filtered out based on their absence from the whitelist, and the remaining tags were prepended as strings. Referring to FIG. 8, a flow chart (800) is provided illustrating application of augmenting a run-time query. As shown, using a taxonomy, one or more appropriate taxonomy tags as related to the query are identified (802). The variable $N_{Total}$ is assigned to the quantity of identified tags (804), and an associated tag counting variable, N, is initialized (806). For each tag, N, it is determined if the tag is present in the whitelist and has a confidence score that meets or exceeds a threshold value (808). In one embodiment, the confidence score is set at greater than or equal to 0.10. This process is similar to the filtering shown and described in the training process, but with a different confidence threshold value. In one embodiment, a higher threshold is employed during training to that the training is taking place on data associated with a high confidence. The higher threshold filter out taxonomy results that are less than 70% confident, thereby erring on removing non-confident data from the model. However, during run-time, the goal is to be inclusive, and as such, in one embodiment, the threshold is set to a low confidence value to reflect and enable inclusive behavior. The low threshold will allow more taxonomy tags to enter by filtering fewer tags. Similar to the training model, in one embodiment, the run-time confidence score is a configurable value. A positive response to the determination at step (808) is followed by retaining the tag, e.g. $tag_N$, in the query (810), and a negative response is followed by removing the tag from the whitelist (812). Following either step (810) or (812), the tag counting variable, N, is incremented (814), and it is determined if all of the identified tags have been evaluated (816). A negative response to the determination at step (816) is following by a return to step (808). However, a positive response to the determination at step (816) is followed by constructing a string to prepend to the query (818). Accordingly, the artificial intelligence query processing with a deployed whitelist returns string data with one or more prepended tags to the query.

Figure 9:
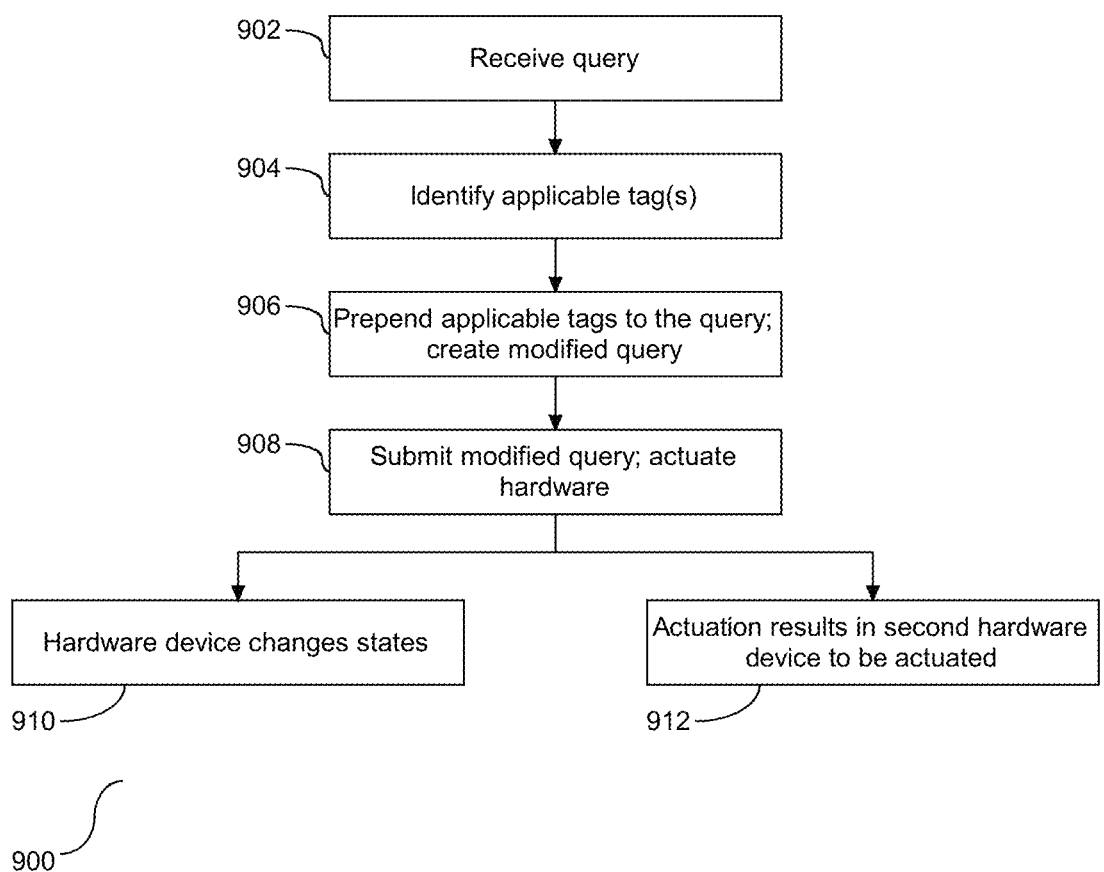
FIG. 9 depicts a flow chart illustrating a process for processing GT data in relation to a physical hardware device.

As shown and described in FIGS. 1-7, the identification and application of tags to GT data in the training process creates an appended query during run-time, as shown in FIG. 8. In one embodiment, the appended query, with the identified tags prepended, may be applied to a sorting algorithm, which in one embodiment may cause an associated machine, e.g. hardware device, to perform an action. Referring to FIG. 9, a flow chart (900) is provided illustrating a process for processing data query in relation to a physical hardware device. As shown, the query is received (902), one or more applicable tags are identified (904), and the applicable tags are prepended to the query (906) thereby creating a modified query. Submission of the modified query results in a first hardware device being actuated (908). This actuation at step (908) may cause the first hardware device to change states (910), e.g. from a first state to a second state. Similarly, this actuation may result in a second hardware device being actuated to perform a second action (912). In this example, the first and second hardware devices are different and the corresponding actions are different. Submission of the modified query with the prepended string(s) produces a physical action on a hardware device that is different in form and function from the physical action associated without the prepended string(s). For example, in one embodiment, the query without the prepended string(s)

and the query with the prepended string may be assigned to different hardware devices, with the strings identifying the physical hardware device. In one embodiment, the query without the prepended string(s) and the query with the prepended string may be assigned to the same physical hardware device, with actuation producing different physical output. Similarly, in one embodiment, the query without the prepended string(s) and the query with the prepended string may be addressed to different physical devices. Accordingly, as shown a physical intent from the modified query is converted into a physical manifestation that produces one or more physical transformation upon invocation of the query with the prepended string(s).

The linguistic analysis processing shown and described in FIGS. 1-8 may be performed by a natural language processing system, such as the information handling system shown in FIG. 1, or any suitable information handling system. In one embodiment, a sentence parsing tool is applied to break the text representation into constituent parts to find the sentence parts and location sequence, and to identify a segment or keyword within the representation.

Embodiments may be in the form of a system with an intelligent computer platform for deciphering input content and identifying one or more appropriate GT tags. A processing unit is operatively coupled to memory and is in communication with an artificial intelligence platform. A tool, such as the knowledge engine (170) and/or run-time manager (172), also in communication with the processing unit, is employed to process the GT data, identify one or more appropriate tags, and prepend the identified tag(s) to the GT data upon activation by the artificial intelligence platform. The procedure of the natural language processing utilizes a natural language processing tool.

The system and flow charts shown herein may also be in the form of a computer program device for use with an intelligent computer platform in order to facilitate NL processing. The device has program code embodied therewith. The program code is executable by a processing unit to support the described functionality.

Embodiments may also be in the form of a computer program device for use with an intelligent computer platform in order to assist the intelligent computer platform to evaluate text input of audio data. The device has program code embodied therewith. The program code is executable by a processing unit to parse and/or evaluate text representation with respect to a taxonomy or a taxonomy service.

It will be appreciated that there is disclosed herein a system, method, apparatus, and computer program product for evaluating natural language input, detecting one or more tags, and prepending one or more selected tags to the natural language input. As disclosed, the system, method, apparatus, and computer program product apply natural language processing to an information source, which in one embodiment, is operatively coupled to and actuates a physical hardware device.

While particular embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiment(s) may be a system, a method, and/or a computer program product. In addition, selected aspects of the present embodiment(s) may take the form of an entirely hardware embodiment, an entirely software embodiment (including firmware, resident software, microcode, etc.) or an embodiment combining software and/or hardware aspects that may all generally be referred to herein as a "circuit," "module" or "system." Furthermore, aspects of the present embodiment(s) may take the form of computer program product embodied in a computer readable storage medium (or media) having computer readable program instructions thereon for causing a processor to carry out aspects of the present embodiment(s). Thus embodied, the disclosed system, a method, and/or a computer program product are operative to improve the functionality and operation of a one or more physical hardware devices or operating states thereof.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiment(s) may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiment(s).

Aspects of the present embodiment(s) are described herein with reference to flowchart illustrations and/or block diagrams of methods, apparatus (systems), and computer program products according to the embodiment(s). It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiment(s). In particular, the natural language processing may be carried out by different computing platforms or across multiple devices. Furthermore, the data storage and/or corpus may be localized, remote, or spread across multiple systems. Accordingly, the scope of protection of the embodiment(s) is limited only by the following claims and their equivalents.

What is claimed is:

1. A computer system comprising:
  a processing unit operatively coupled to memory;
  an artificial intelligence platform, in communication with the processing unit;
  a knowledge engine in communication with the processing unit to transform ground truth (GT) data by the artificial intelligence platform, including:
    transform GT data, including process the GT data with a first group of one or more taxonomy tags that exceed a threshold;
    construct a training module to identify a second group of one or more taxonomy tags related to an ontology path of the GT data, wherein the identification of the second group of one or more taxonomy tags is based on an assessment applied to the transformed GT data;
  the knowledge engine to execute the constructed training module, and apply the identified second group of one or more taxonomy tags to the GT data, including append the identified second group of one or more taxonomy tags to the GT data; and
  the knowledge engine to construct a query, the query including a string of the GT data with one or more of the identified taxonomy tags from the second group of taxonomy tags prepended to the string, the query including at least one synset and an immediate hypernym to an ontology path of the GT data.

2. The system of claim 1, wherein the threshold utilizes a configurable parameter.

3. The system of claim 1, wherein the assessment utilizes a configurable parameter.

4. The system of claim 1, further comprising a library operatively coupled to the training module, the library to store a plurality of taxonomy tags.

5. The system of claim 4, further comprising the knowledge engine to control a population of taxonomy tags stored in the library.

6. The system of claim 5, further comprising the knowledge engine to identify one or more tags stored in the library that negatively impact performance, and remove the identified tags from the library.

7. The system of claim 1, further comprising a hardware device operatively coupled to the knowledge engine, the hardware device to receive the constructed query, wherein submission of the query causes a physical action selected from the group consisting of: the hardware device to change states and actuation of a second hardware device, and combinations thereof.

8. A computer program product to process natural language (NL), the computer program product comprising a computer readable storage device having program code embodied therewith, the program code executable by a processing unit to:
 transform ground truth (GT) data by the artificial intelligence platform, including:
  transform GT data, including process the GT data with a first group of one or more taxonomy tags that exceed a threshold;
  construct a training module to identify a second group of one or more taxonomy tags related to an ontology path of the GT data, wherein the identification of the second group of one or more taxonomy tags is based on an assessment applied to the transformed GT data;
 execute the constructed training module, and apply the identified second group of one or more taxonomy tags to the GT data, including append the identified second group of one or more taxonomy tags to the GT data; and
 construct a query, the query including a string of the GT data with one or more of the identified taxonomy tags from the second group of taxonomy tags prepended to the string, the query including at least one synset and an immediate hypernym to an ontology path of the GT data.

9. The computer program product of claim 8, wherein the threshold utilizes a configurable parameter.

10. The computer program product of claim 8, wherein the assessment utilizes a configurable parameter.

11. The computer program product of claim 8, further comprising a library to store a plurality of taxonomy tags.

12. The computer program product of claim 11, further comprising program code to control a population of taxonomy tags stored in the library.

13. The computer program product of claim 12, further comprising program code to identify one or more tags stored in the library that negatively impact performance, and remove the identified tags from the library.

14. The computer program product of claim 8, further comprising a hardware device operatively coupled to the computer readable storage device, the hardware device to receive the constructed query, wherein submission of the query causes a physical action selected from the group consisting of: the hardware device to change states and actuation of a second hardware device, and combinations thereof.

15. A method for processing natural language, comprising:
 transforming ground truth (GT) data by an artificial intelligence platform, including:
  transforming GT data, including processing the GT data with a first group of one or more taxonomy tags that exceed a threshold;
  constructing a training module to identify a second group of one or more taxonomy tags related to an ontology path of the GT data, wherein the identification of the second group of one or more taxonomy tags is based on an assessment applied to the transformed GT data;
 executing the constructed training module, and applying the identified second group of one or more taxonomy tags to the GT data, including appending the identified second group of one or more taxonomy tags to the GT data; and
 constructing a query, the query including a string of the GT data with one or more of the identified taxonomy tags from the second group of taxonomy tags prepended to the string, the query including at least one synset and an immediate hypernym to an ontology path of the GT data.

16. The method of claim 15, wherein the threshold utilizes a configurable parameter.

17. The method of claim 15, wherein the assessment utilizes a configurable parameter.

18. The method of claim 15, further comprising storing a plurality of taxonomy tags in an operatively coupled library and controlling a population of taxonomy tags stored in the library.

19. The method of claim 18, further comprising identifying one or more tags stored in the library that negatively impact performance, and removing the identified tags from the library.

20. The method of claim 15 further comprising a hardware device operatively coupled to the artificial intelligence platform, the hardware device to receive the constructed query, wherein submission of the query causes a physical action selected from the group consisting of: the hardware device to change states and actuation of a second hardware device, and combinations thereof.

* * * * *